United States Patent [19]

Murray et al.

[11] 4,042,408
[45] Aug. 16, 1977

[54] HYDRAULIC CEMENTS

[75] Inventors: Ransom James Murray, Gravesend; Arthur William Brown, London, both of England

[73] Assignee: The Associated Portland Cement Manufacturers Limited, England

[21] Appl. No.: 674,034

[22] Filed: Apr. 5, 1976

[30] Foreign Application Priority Data

Apr. 17, 1975 United Kingdom ............... 15878/75

[51] Int. Cl.² ............................................. C04B 7/02
[52] U.S. Cl. .................................................. 106/100
[58] Field of Search .................. 106/89, 100, 103, 104

[56] References Cited

U.S. PATENT DOCUMENTS 1,904,640  4/1933  Windecker .............................. 106/89
3,251,701  5/1966  Klein ..................................... 106/100

Primary Examiner—J. Poer
Attorney, Agent, or Firm—Diller, Brown, Ramik & Wight

[57] ABSTRACT

A method of making a special high strength cement of the Portland type containing alite of improved hydraulic activity, wherein argillaceous and calcareous materials are combined to form clinker by heating in a kiln and the resulting clinker is ground to form a cement, comprising the step of introducing into the kiln a combination of mineralizers which contains fluorine and sulphur, provided that an alkali metal compound which can be a component of the aforesaid combination of mineralizers is included in the combination of mineralizers at least when the condition that the lime saturation factor be at least 0.98 and the silica ratio be at least 4 is not met.

30 Claims, No Drawings

HYDRAULIC CEMENTS

This invention relates to hydraulic cements, that is cements which, upon mixing with water and placing, set and harden to give substantial strength, and more particularly to cements with high and rapid strength development of the Portland type.

Throughout this specification the following notations are used:

$$S = SiO_2$$
$$A = Al_2O_3$$
$$F = Fe_2O_3$$
$$C = CaO$$

The chemical parameters LSF, S/R and A/F referred to are defined as:

$$\text{Lime Saturation Factor } (LSF) = \frac{CaO}{2.8\, SiO_2 + 1.2\, Al_2O_3 + 0.65\, Fe_2O_3}$$

$$\text{Silica Ratio } (S/R) = \frac{SiO_2}{Al_2O_3 + Fe_2O_3}$$

$$\text{Alumina Ratio } (A/F) = \frac{Al_2O_3}{Fe_2O_3}$$

In the foregoing ratios the chemical symbols represent percentage by weight of the identified substance present in the composition under consideration.

In the following description and claims the percentages referred to are by weight.

It is known that the hydraulic acitivity of conventional Portland cement can be modified to a limited extent by adjusting the proportion of the hydraulic phases in the clinker, or by altering the cement fineness or its particle size distribution. It is also known that very rapid setting and hardening can be produced by making additions of accelerators or of so-called High-Alumina cement to Portland cement. By High-Alumina cement is meant cement, referred to in the U.S.A. as Calcium Aluminate cement, in which the principal hydraulic constituent is monocalcium aluminate (CA). In practice such adjustments to Portland cement are limited in extent by other factors than setting and hardening and generally produce an improved early strength at the expense of the strength at later ages or conversely an improved late strength at the expense of early strength. In the case where the strength is improved by altering the particle size distribution or overall fineness, this is often achieved at the expense of the workability of the resultant concrete. There is also the disadvantage, in some of the above methods of obtaining rapid setting and hardening, of it being difficult to obtain consistent and reproducible results, particularly when making a concrete with an aggregate contaminated with or containing substances capable of acting as accelerators or retarders since very small quantities of such substances can have a considerable effect on the setting time achieved. A further disadvantage of rapid hardening Portland cements in which accelerators have been incorporated is that a number of the applications in which rapid hardening cements are most useful are those which may involve the pumping of a slurry of the cement or a concrete containing it, and such Portland cements do not give good results with higher than normal water to cement ratios. High-Alumina cement on the other hand is expensive and, although achieving rapid early strength development and ultimate strength obtained by the use of this cement alone is detrimentally affected by the conversion of its hydrated phases.

We have previously described three forms of early strength cement which did not present the rheological problems and poor reproducibility of results associated with accelerated Portland cements and which where cheaper than High-Alumina cement and did not produce potentially unstable hydrates.

These three forms of early strength cement are as follows:

1. An early strength hydraulic cement comprising 7 to 90 percent by weight of $C_{12}A_7$, most of the balance being calcium silicates and the cement being poor in CA or $C_3A$. In a preferred composition the clinker rich in $C_{12}A_7$ and poor in CA or $C_3A$ is interground with Portland cement clinker, the resultant early strength cement including at least 10 percent by weight of $C_{12}A_7$ with a majority of the balance being calcium silicates and including at least 10 percent by weight of $C_3S$. (U.K. Pat. No. 1,387,075).

2. An early strength hydraulic cement comprising from 15 to 90 percent by weight, based on the cement, of an alkali metal calcium aluminate phase formed in the calcium oxide-alumina-alkali metal oxide systems by the presence of at least one alkali metal oxide in a total amount of alkali metal oxide in excess of the solid solution limit thereof in cubic tricalcium aluminate, at least part of the alkali metal oxide being sodium oxide and the balance of the cement being perdominantly calcium silicates. The abovementioned alkali metal calcium aluminate phase is believed to correspond with the formula $(C_{1-x}N_x)_3A$ where x lies between 0.06 and 0.07, and N typically represents $Na_2O$ which may be partly replaced by another alkali metal oxide; this phase approximates to $NC_{14}A_5$. (British patent application No. 45972/73; U.S. Pat. No. 3,942,994).

3. An early strength hydraulic cement comprising 7.0 to 90 percent by weight of $C_{12}A_7$, the majority of the balance being hydraulic calcium silicates, wherein the $C_{12}A_7$ phase is formed in an underlimed clinker burned to a low free lime (an underlimed clinker being defined as a clinker in which the lime limitation factor (LLF) is less than unity where $$LLF = \frac{CaO}{1.87\, SiO_2 + 0.94\, Al_2O_3 + 0.65\, Fe_2O_3}$$

the chemical symbols representing the amounts of the represented substances present), the underlimed condition being at least counterbalanced in the cement by the presence of a substance effective to increase the basicity of the composition. This cement can satisfy the preferred composition noted in foregoing paragraph (1). The substance effective to increase the basicity of the composition may be for instance a metal oxide present in the $C_{12}A_7$-rich clinker in solid solution in substitution for CaO in the lattices of major phases, or a source of calcium ions added to the cement (U.K. Patent Application No. 53104/74). The early strength cements of the three foregoing paragraphs are referred to herein as "early strength cements o the foregoing type". With such cements the rapid setting and early strength was achieved at the expense of the later strengths which were lower than those of normal Portland cements.

One object of the invention is the provision of cements having improved early and late strengths for a given specific surface area, that is to say, either having similar setting and workability properties to those of normal Portland cement but with both a higher early and a higher late strength; or having similar strength development characteristics to those of normal Portand cements but with lower corresponding specific surface areas.

A further object of this invention is the provision of cements with at least similar setting, workability, and strength development properties to those of normal Portland cements but containing little or no sulphate.

A further object of this invention is the provision of cements with similar rapid but controlled setting and early strength properties to those of early strength cements of the foregoing type but which also possess very similar ultimate strength to that obtained with normal Portland cement.

A further object of the present invention is to produce high early strength cements with similar properties to those of some early strength cements of the foregoing type but which require less retarder such as citric acid to achieve the desired pumpability time and delay in setting time.

Another object of this invention is to produce a cement with similar properties to those of some early strength cements of the foregoing type but containing less of the hydraulic $C_{12}A_7$ phase which contributes to the very early setting and rapid hardening, thereby permitting the production of a clinker less rich in $C_{12}A_7$ which could be prepared from only calcareous and argillaceous raw materials and obviates the necessity for the more expensive aluminous component such as bauxite.

We have found that the foregoing objects can surprisingly be achieved by means of a particular combination of mineralisers.

It is known that small amounts of calcium sulphate, alkali metal sulphate, calcium fluroide or other compounds which are often present as trace impurities in Portland cement raw materials can aid in the combination of those materials during burning, i.e., as mineralisers. It is also known that by entering into solid solutions in certain of the clinker phases during buring these said impurities can effect the hydraulic properties of the resultant cement. Thus the mineralising effect of calcium fluoride on Portland cement mixes by enhancing the formation of the clinker phases, paticularly the silicate phases, during burning, and the concomitant retardation of the set and the depression of the early strength of the resultant concrete by such an addition, is well documented in the literature.

The use of calcium sulphate or alkali metal sulphate additions as mineralisers for Portland cement compositions, permitting a reduction in the burning temperature and a saving of fuel consumption has also been reported by several workers, (P. P. Budnikov and I. P. Kuznetsova, J.Appl.Chem. (U.S.S.R) 35,913 1962; P. P. Budnikov, I. P. Kuznetsova and W. G. Saveljer, Silikattechnik 16, 414–417, 1965; R. D. Azelitskaya, I. F. Ponomarev et al., Tsement 2, 6, 1969; T. A. Ragozina and M. .A. Akhmedov Uzbek khim zh 6,5–11 1962). In some instances, however, these additions rather than enhancing the combination of the raw materials may lead to sulphate ions entering into solid solution in the belite (essentially dicalcium silicate, $C_2S$) phase thereby stabilising this phase to the extent that the formation of alite (essentially tricalcium silicate, $C_3S$) phase is inhibited and the lime which would otherwise have combined to form this alite phase remains an uncombined lime in the clinker. Recent work has suggested that this phenomenon can occur when there is little or no MgO in the clinker (W. Gutt and M. A. Smith, Trans. Brit. Cer. Soc. 487–510, 1968, and Cement Technology Sept/Oct., 1971). We have determined that the level of MgO required to prevent this stabilisation of the belite is of the order of 2 percent, although the presence of MgO contents of this order in the clinker could under certain circumstances lead to potential unsoundness problems in the final cement.

However, we have also found, that if an addition of calcim fluoride or other suitable mineraliser containing fluorine is made with the addition of calcium sulphate or a mixture of calcium sulphate and alkali metal sulphate then this dependence of the mineralising action on the presence of a limiting level of MgO is eradicated.

In addition we have found that the addition of the above combination of alkali metal sulphate, calcium sulphate and fluoride mineralisers, when made to a normal Portland cement raw mix such that part or all of the fluorine and sulphate components are retained within the clinker, surprisingly produces a cement with both enhanced early and late strengths. This may be because the combined mineralising action of both the fluoride and the sulphate additions, together with the initial stabilisation of the belite phase before this is countered by the fluorine, leads to the formation of alite crystals of increased hydraulic activity. We have found that the said combination of mineralisers is also particularly effective when incorporated in raw feeds to produce clinker compositions of high lime saturation factor (LSF), typically in the range 0.98 – 1.08, and of high silica ratio (S/R), typically in excess of 4, and preferably less than 20, since their mineralising action not only achieves the combination of these compositions at normal firing temperatures, which would otherwise be difficult if not impossible to achieve, but results in the formation of clinkers rich in silicates, particularly alite of the aforementioned active form, typically at least 65 percent and advantageously at least 70 percent, and sparse in both $C_3A$ and $C_4AF$ content. As a consequence these clinkers, when ground to specific surface areas similar to those of normal Portland cements, yield cements which have at least higher late strengths even when little or none of the mineralisers or their derivatives are retained within them and may, if sufficient alkali metal sulphate is retained within them, have both enhanced early and late strengths.

The clinkers referred to in the foregoing paragraph which yield cements of enhanced strength as a result of an addition of the abovementioned combination of mineralisers of calcium fluoride and a calcium sulphate or a mixture of calcium sulphate and an alkali metal sulphate to their raw mixes, regardless of whether this enhanced strength arises from the retention of all or part of these mineralisers or their derivatives in the clinker or by the abovementioned mineralisers leading to the formation of clinkers of increased alite content, are for the purposes of this specification collectively called "active alite clinkers".

Cements produced from some of these active alite clinkers are particularly useful for incorporating with a pulverised fuel ash (PFA) to produce a pozzolanic cement or a blast furnace slag (BFS) to product a blast furnace slag cement, since their higher strengths in comparison with normal Portland cement permit a larger addition of PFA or BFS to be made in order to achieve the same strength properties of the mixture.

Some of the active alite clinkers defined above also have distinct advantages over normal Portland cement clinkers in the production of high early strength cements containing $C_{12}A_7$. Firstly, we have found that their contribution to the early strength is sufficient to permit reducing the $C_{12}A_7$ content in the $C_{12}A_7$-rich component, thereby obviating the use of an expensive aluminous ingredient such as bauxite when preparing the raw mix for this clinker. Secondly, we have found that, because of their lower $C_3A$ content and possibly other factors, a significant reduction in the quantity of retarder such as citric acid is required to control the pumpability and setting characteristics of these cements. Thirdly, we have found that, although the incorporation of the $C_{12}A_7$ phase in the final cement reduces the potential late strength of cements prepared from these active alite clinkers it is possible to adjust the proportions such that not only early strengths within 2 hours after gauging, but also ultimate strengths, similar to those of conventional Portland cement are obtained.

According to the present invention, therefore, we provide a method for making a special high strength cement of the Portland type containing alite of improved hydraulic activity, wherein argillaceous and calcareous materials are combined to form clinker by heating in a kiln and the resulting clinker is ground to form a cement, comprising the step of introducing into the kiln a combination of mineralisers which contains fluorine and sulphur, provided that an alkali metal compound which can be a component of the aforesaid combination of mineralisers is included in the combination of mineralisers at least when the condition that the lime saturation factor be at least 0.98 and the silica ratio be at least 4 is not met.

The combination of mineralisers including, where required, the alkali metal compound, may be introduced into the kiln either separately or together by incorporation in the raw fed or by some other method such as by insufflation, or with the fuel.

The source of fluorine other than that in the main raw materials is preferably calcium fluoride. The source of sulphur other than that derived from the main raw materials and the fuel is preferably one or a combination of calcium sulphate or its hydrates, an alkali metal sulphate or a double alkai metal calcium sulphate, most preferably gypsum or potassium sulphate. The preferred sources of alkali metal, where required, are the main raw materials or the fuel or the additions of alkali metal sulphate specified above. The mineralisers may be supplied as such or in a form which will yield them under kiln conditions or by reaction with the feed, such as by the addition of sulphuric or hydrofluric acids. Other mineralisers may be present in the form of impurities.

Components of the mineralisers, containing part or all of the fluorine, sulphate and alkali metal therefrom, may be retained in the clinker and will be so retained in the case where LSF is less than 0.98 and the silica ratio is less than 4. The sulphate may be present in the clinker as a calcium sulphate, an alkali metal sulphate, a double alkali metal calcium sulphate salt or a mixture thereof.

In the case where the lime saturation factor is less than 0.98 and the silica ratio is less than 4, the clinker contains 0.01 to 1 percent fluoride, more preferably 0.01 to 0.5 percent fluoride, and 1.5 to 5.0 percent $SO_3$, of which at least 0.5 percent is present in combination with an alkali metal, by weight based on the clinker. In the case where the lime saturation factor is in excess of 0.98 the clinker contains 0.01 to 1 percent fluoride, more preferably 0.01 to 0.5 percent fluoride and 0.1 to 5.0 percent $SO_3$ by weight based on the clinker; although where an enhanced early strength is required at least 0.5 percent $SO_3$ must be present in combination with an alkali metal by weight based on the clinker.

In a preferred embodiment the invention permits the production of a clinker with a lime saturation factor from 0.98 to 1.08 and a silica ratio from 4 to 20, which is rich in alite, that is it contains at least 65 percent, preferably 70 percent, alite by weight.

Cements according to this invention are typically ground to specific surface areas as specified by the air permeability method according to British Standard Specification (BS) 12 (1971), in the range 200 – 800 $m^2/kg$ and normally to specific surface areas in the range 250 – 500 $m^2/kg$. In general, grinding to the higher specific surface areas improves both the early and late strengths of the cement.

The cement properties may be controlled by the quantity and nature of the mineralisers or their derivatives retained within the clinker. The desired level of retention may be obtained by varying the quantities and form of mineralisers added or their method of introduction or the clinker burning regime.

In some instances by retaining the desired quantity of sulphate or fluorine in the active alite clinkers it is possible to produce a cement with the requisite handling and setting characteristics without the necessity to make the otherwise usual extra additions of calcium sulphate or other retarders or setting time regulators at the final grinding stage.

In applications where high strength both at early and late ages is required, retention in the clinker of all or part of any alkali metal sulphate either added as a mineraliser or derived therefrom is advantageous.

In other particular applications such as in the binding of iron ore fines requiring very low sulphur contents in the final cement, we have found that adequate set control and strength development can be achieved without further addition of gypsum or other retarders even when little sulphate is retained in the clinker.

Alternatively and particularly where the clinker herein defined is only a part of the clinker components of a cement, calcium sulphate in the form of natural or synthetic gypsums, hemi-hydrate, soluble anhydrite or a mixture thereof is preferably added to the cement typically to give a total cement sulphate content in the range of 1 – 8 percent, to achieve the optimum strength development and the desired setting characteristics. Small additions of retarders or accelerators also effective in producing the desired setting characteristics and strength development may also be made to such cements. Typical retarders employed for this purpose are the established retarders for Portland cement, citric acid or other organic hydroxy acids, sucrose and glucose. Typical accelerators are established accelerators for Portland cements such as calcium chloride or grinding aids such as a mixture of triethanolamine and acetic acid.

Where the active alite clinker of the invention is only part of the clinker components of a cement it may be incorporated in such cements either by grinding together all of the several components or by grinding them separately and thoroughly blending them in a finely divided form. In the instance where very early strengths are produced by the incorporation of $C_{12}A_7$ in the cement it is particularly preferable to make small additions of the retarders or accelerators defined above effective to provide the desired setting time sufficient for the purpose for which the cement is intended. These additions may be ground with the clinker or in some instances either bleneded in the final cement before supply to a user, or supplied separately so that the user may add it during mixing in order to adjust the setting time and hardening rate to his own requirements.

The mineralisers herein defined which are introduced into the kiln in the various ways hereinbefore mentioned may be a variety of forms. They may be as pure compounds added in the same or different ways to either the raw feed or the fuel to supplement any desired mineraliser which may already be in these materials as minor components or impurities, or they may be a material which contains sufficient mineralisers together with one or more of the main chemical components of this cement, or they may be in any other form. As a particular example the requisite mineralisers could be introduced into the kiln by the insufflation of a suitable precipitator dust obtained from normal Portland cement manufacture.

It is also possible to utilise the combination of mineralisers herein defined in a number of different processes and this is illustrated in the several ways that the active alite clinker of the invention can be prepared.

In one method the raw feed is sintered in a conventional wet, semi-wet, semi-dry or dry process used for normal Portland cement manufacture or a cement/sulphuric acid process such as the Mueller-Kuhne process at a burning temperature typically in the range 1200° – 1550° C to provide a clinker with a satisfactory degree of combination as judged by the uncombined lime being below 5 percent and preferably below 2 percent. In a particular application of this method additions of compounds containing fluorine and sulphur as defined above, are made to a blend of raw materials consisting of argillaceous and calcareous materials in such proportions as to favour the formation of a large proportion of alite in a clinker with an LSF typically in the range 0.98 to 1.08, and a S/R typically greater than 4.

The amounts added to compounds containing fluorine lie typically in the range 0.1 – 2 percent, and preferably 0.2 – 0.5 percent, equivalent fluorine and the amount of sulphur bearing compounds herein defined, lies typically in the range 1 to 10 percent, and preferably 2 – 5 1 percent, equivalent $SO_3$, as a percentage of the clinker. These additions to the raw feed are made with the object of achieving during firing both a satisfactory degree of combination and the requisite retention of the volatiles in the clinker.

In another method a raw feed is sintered in a fluidised bed process in the presence of the mineralisers previously defined. An advantage of this technique over those described above is that in the fluidised bed process the volatilisation of mineralisers during sintering can be both enhanced and more accurately controlled. As a result it is possible to incorporate more of the said mineralisers in the raw feed, thereby achieving a satisfactory degree of combination at burning temperatures typically in the region of 1100°–1200° C, whilst retaining in the clinker only the desired levels of mineralisers or their derivatives.

The levels of mineralisers required can also be maintained in the above processes by achieving reincorporation of the volatile components, either by ensuring an efficient recirculating load or by returning the collected dust, thereby minimising the additions of mineralisers that need to be made to the system.

In another method the raw feed consisting of argillaceous and calcareous materials proportioned as in the foregoing method is at least partially melted in the presence of compounds containing fluorine, sulphur, and alkali if required, as previously defined, in a furnace such as a reverbatory furnace. The additions of compounds containing fluorine and sulphur and other mineralisers may be increased to achieve combination in the partial melt typically in the range of 900° – 1450° C. The advantage of such a process is that, unlike the sintering techniques described above, volatilisation and subsequent collection and recirculation of the alkalis and sulphate, which can present difficulties, are avoided. During the melting process crystals of alite and the other phases which constitute the clinker herein defined form, and these can be physically separated from the liquid rich in the mineralisers. This process of separation either by centrifugal or other techniques is normally sufficiently beneficient to produce the desired clinker composition and to permit the re-use of the liquid rich in mineralisers. If required, further reduction in the volatiles retained within the high alite clinker fraction can be achieved by volatilisation in a further process step.

Cements composed wholly or in part of the active alite clinker of this invention may be used in a number of ways. They may be employed with high quality aggregates in applications where the higher early and late strengths than those achieved with normal Portland cements are distinctly advantageous. They may also be employed in patching roads or airport runways or in applications requiring a rapid turnover of shuttering or moulds, where the resultant product must not only have an adequate early strength but must eventually yield a strength at least as great as that of normal Portland cement. They may be used as a binder of fibre reinforced composites, light weight aggregates and foundry sands and can be used as a bonding agent in the binding of ore fines for metallurgical processes. In the particular instance where the cement is prepared from a clinker containing $C_{12}A_7$ and the active alite clinker of this invention, it finds special utility in binding materials from coal measures even when contaminated with or consisting of coal, the organic constituents of which can have an unpredictable effect upon the behaviour of some other known rapid hardening cements. DE The invention is illustrated by the following Examples in which all percentages and parts are by weight.

EXAMPLE 1

A clinker comprising mainly alite was prepared as follows.

The following raw materials with principal oxide analyses of:

|  | Chalk | Sand | Clay | Gypsum | Iron Oxide |
|---|---|---|---|---|---|
| $SiO_2$ | 1.2 | 99.3 | 41.9 | 0.2 | 1.1 |
| $Al_2O_3$ | 0.4 | 0.3 | 11.5 | 0.3 | 0.6 |
| $Fe_2O_3$ | 0.2 | 0.1 | 3.8 | 0.01 | 96.9 |
| CaO | 54.8 | 0.1 | 19.5 | 32.0 | 0.5 |
| $SO_3$ | 0.1 | 0.01 | 0.1 | 46.5 | 0.02 | were utilized to form a mix by blending in the approximate proportions (dry basis) 74.7 percent chalk, 12 percent sand, 5.8 per cent clay, 6.9 percent gypsum, 0.1 percent iron oxide together with 0.5 percent calcium fluoride and grinding in a ball mill to a residue of 5 per cent on a BS 90 μm sieve. The raw feed so obtained was mixed with water and pressed into cakes and these after thoroughly drying were sintered in an oil-fired furnace at about 1525° C to produce a clinker with the following analysis:

| | | |
|---|---|---|
| $SiO_2$ | 24.5 | percent |
| $Al_2O_3$ | 1.6 | percent |
| $Fe_2O_3$ | 0.8 | percent |
| $Mn_2O_3$ | 0.03 | percent |
| $P_2O_5$ | 0.06 | percent |
| $TiO_2$ | 0.05 | percent |
| CaO | 70.5 | percent |
| MgO | 1.1 | percent |
| $SO_3$ | 0.12 | percent |
| $F_2$ (as fluoride) | 0.28 | percent |
| L.O.I | 0.6 | percent |
| $K_2O$ | 0.05 | percent |
| $Na_2O$ | 0.06 | percent | the LSF was 0.99, the S/R 10.21, L the A/F 2.00 and the free lime content as determined by the hot ethylene glycol extraction method 1.7 percent. The potential compound composition of this clinker as calculated from its oxide analysis, allowing for the free lime and assuming that all the sulphate over that which could form alkali sulphate is present in the clinker as calcium sulphate is:

| | | |
|---|---|---|
| $C_3S$ | 81.9 | percent |
| $C_2S$ | 8.5 | percent |
| $C_3A$ | 2.9 | percent |
| $C_4AF$ | 2.4 | percent |
| $CaSO_4$ | NIL | percent |
| Alkali Sulphates | 0.2 | percent |
| Free Lime | 1.7 | percent | together with other minor phases.

A cement was prepared by grinding this clinker with gypsum to a specific surface area of 330 m²/kg as measured by the air permeability method according to B.S. 12 (1971). The quantity of gypsum added was such as to give a total sulphate content in the cement attributable both to the added gypsum and to that present in the clinker of 1.5 percent as determined by analysis. A concrete for compressive strength tests was made up from 1 part cement, 3.5 parts Mountsorrel granite, 2.5 parts Curtis sand and 0.55 parts water. The test results for the compressive strengths of 100 mm concrete cubes determined according to B.S. 12 (1971) were as follows:

| | |
|---|---|
| After 3 days | 23 MN/m² |
| 7 days | 31 MN/m² |
| 28 days | 48 MN/m² |

A second cement was prepared by grinding this clinker with gypsum to a specific surface area of 450 m²/kg as measured by the method previously described. The quantity of gypsum added was such as to give a total cement sulphate content of 2.3 percent. When made up as a concrete and tested as above the compressive strengths of 100 mm concrete cubes were as follows:

| | |
|---|---|
| After 3 days | 33 MN/m² |
| 7 days | 44 MN/m² |
| 28 days | 61 MN/m² |

EXAMPLE 2

A clinker was prepared as in Example 1 employing the raw materials described therein by blending in the approximate proportions (dry basis) 70.8 percent chalk, 7.6 percent sand, 6.8 percent gypsum, 14.3 percent clay, together with 0.5 percent calcium fluoride, and sintering in an oil-fired furnace at around 1525° C to produce a clinker with the following analysis:

| | | |
|---|---|---|
| $SiO_2$ | 23.1 | percent |
| $Al_2O_3$ | 3.2 | percent |
| $Fe_2O_3$ | 1.1 | percent |
| $Mn_2O_3$ | 0.03 | percent |
| $P_2O_5$ | 0.06 | percent |
| $TiO_2$ | 0.06 | percent |
| CaO | 69.9 | percent |
| MgO | 1.0 | percent |
| $SO_3$ | 0.5 | percent |
| $F_2$ (as fluoride) | 0.15 | percent |
| L.O.I. | 0.7 | percent |
| $K_2O$ | 0.06 | percent |
| $Na_2O$ | 0.05 | percent | the LSF was 1.01, the S/R 5.37, the A/F 2.91 and the free lime content as determined by the method previously described 2.9 percent. The potential compound composition of this clinker as calculated by the method employed in Example 1 is:

| | | |
|---|---|---|
| $C_3S$ | 72.9 | percent |
| $C_2S$ | 11.3 | percent |
| $C_3A$ | 6.6 | percent |
| $C_4AF$ | 3.3 | percent |
| $CaSO_4$ | 0.7 | percent |
| Alkali Sulphates | 0.2 | percent |
| Free Lime | 2.9 | percent | together with other minor phases.

A cement was prepared by grinding this clinker to a specific surface area of 450 m²/kg as measured by the method in Example 1.

The paste setting times according to B.S. 12 (1971) were:

| | |
|---|---|
| At percent consistency water | 24.8 |
| Initial Set | 45 minutes |
| Final Set | 100 minutes |

When made up as a concrete and tested as in Example 1, the compressive strengths of 100 mm concrete cubes were as follows:

| | |
|---|---|
| After 3 days | 41 MN/m² |
| 7 days | 57 MN/m² |
| 28 days | 69 MN/m² |

A second cement was prepared by grinding this clinker with gypsum to a specific surface area of 460 m²/kg as measured by the method in Example 1. The quantity of gypsum added was sufficient to give a total sulphate content in the cement attributable both to the added gypsum and to that present in the clinker of 2.4 percent as determined by analysis.

The paste setting times according to B.S. 12 (1971) were:

| | |
|---|---|
| At percent consistency water | 25.5 |
| Initial Set | 135 minutes |
| Final Set | 175 minutes |

When made up as a concrete and tested as in Example 1 the compressive strengths of 100 mm concrete cubes were as follows:

| After | 3 days | 40 MN/m$^2$ |
|---|---|---|
| | 7 days | 53 MN/m$^2$ |
| | 28 days | 63 MN/m$^2$ |

EXAMPLE 3

A clinker was prepared as in Example 1, employing the raw materials therein described, by blending in the approximate proportions (dry basis) 70.3 percent chalk, 7.5 percent sand, 13.2 percent clay, 6.5 percent gypsum, together with 2.0 percent potassium sulphate and 0.5 percent calcium flouride, and sintering in an oil-fired furnace at around 1400° C to give a clinker with the following analysis:

| | | |
|---|---|---|
| $SiO_2$ | 21.7 | percent |
| $Al_2O_3$ | 2.6 | percent |
| $Fe_2O_3$ | 1.2 | percent |
| $Mn_2O_3$ | 0.02 | percent |
| $P_2O_5$ | 0.08 | percent |
| $TiO_2$ | 0.13 | percent |
| CaO | 67.2 | percent |
| MgO | 1.0 | percent |
| $SO_3$ | 3.0 | percent |
| $F_2$ (as fluoride) | 0.23 | percent |
| L.O.I. | 1.3 | percent |
| $K_2O$ | 1.4 | percent |
| $Na_2O$ | 0.06 | percent |

The LSF was 1.04, the S/R 5.71, the A/F 2.16 and the free lime as determined by the method previously described 1.9 percent. The potential compound composition of this clinker as calculated by the method employed in Example 1 is:

| | | |
|---|---|---|
| $C_3S$ | 76.3 | percent |
| $C_2S$ | 4.7 | percent |
| $C_3A$ | 4.9 | percent |
| $C_4AF$ | 3.6 | percent |
| $CaSO_4$ | 2.9 | percent |
| Alkali Sulphates | 2.7 | percent |
| Free Lime | 1.9 | percent | together with other minor phases.

A cement was prepared by grinding this clinker to a specific surface area of 250 m$^2$/kg as measured by the method in Example 1.

The paste setting times according to B.S. 12 (1971) were:

| At percent consistency water | 28.5 |
|---|---|
| Initial Set | 305 minutes |
| Final Set | 370 minutes |

When made up as a concrete and tested as in Example 1 the compressive strengths of 100 mm concrete cubes were as follows:

| After | 8 hours | 1 MN/m$^2$ |
|---|---|---|
| | 16 hours | 10 MN/m$^2$ |
| | 24 hours | 18 MN/m$^2$ |
| | 3 days | 37 MN/m$^2$ |
| | 7 days | 44 MN/m$^2$ |
| | 28 days | 52 MN/m$^2$ |

A second cement was prepared by grinding this clinker to a specific surface area of 330 m$^2$/kg as measured by the method in Example 1.

The paste setting times according to B.S. 12 (1971) were:

| At percent consistency water | 28.0 |
|---|---|
| Initial set | 275 minutes |
| Final set | 345 minutes |

When made up as a concrete and tested as in Example 1 the compressive strengths of 100 mm concrete cubes were as follows:

| After | 8 hours | 1 MN/m$^2$ |
|---|---|---|
| | 16 hours | 13 MN/m$^2$ |
| | 24 hours | 24 MN/m$^2$ |
| | 3 days | 42 MN/m$^2$ |
| | 7 days | 50 MN/m$^2$ |
| | 28 days | 57 MN/m$^2$ |

A third cement was prepared by grinding this clinker to a specific surface area of 450 m$^2$/kg as measured by the method in Example 1. The paste setting times according to B.S. 12 (1971) were:

| At percent consistency water | 29.0 |
|---|---|
| Initial set | 265 minutes |
| Final set | 295 minutes |

When made up as a concrete and tested as in Example 1 the compressive strengths of 100 mm concrete cubes were as follows:

| After | 8 hours | 2 MN/m$^2$ |
|---|---|---|
| | 16 hours | 20 MN/m$^2$ |
| | 24 hours | 32 MN/m$^2$ |
| | 3 days | 48 MN/m$^2$ |
| | 7 days | 56 MN/m$^2$ |
| | 28 days | 63 MN/m$^2$ |

EXAMPLE 4

A cement was prepared by intergrinding 98 percent of the clinker described in Example 3 with 2 percent of calcium chloride to a specific surface area of 450 m$^2$/kg.

The paste setting times according to B.S. 12 (1971) were:

| At percent consistency water | 30.0 |
|---|---|
| Initial set | 100 minutes |
| Final set | 125 minutes |

When made up as a concrete and tested as in Example 1 the compressive strengths of 100 mm concrete cubes were as follows:

| After | 4 hours | 2 MN/m$^2$ |
|---|---|---|
| | 8 hours | 13 MN/m$^2$ |
| | 16 hours | 30 MN/m$^2$ |
| | 24 hours | 37 MN/m$^2$ |
| | 3 days | 58 MN/m$^2$ |
| | 7 days | 66 MN/m$^2$ |
| | 28 days | 74 MN/m$^2$ |

EXAMPLE 5

A cement was prepared by grinding the clinker described in Example 3 to a specific surface area of 450 m²/kg as measured by the method in Example 1.

An interblend was made of 10 parts of this cement with 90 parts of a first sample, A, of iron ore with a specific surface area of 518 m²/kg and a gangue content of 10 percent. This blend was pelletised into 15 mm diameter nodules which were then cured for 24 hours in an atmosphere of 100 percent relative humidity at 20° C followed by a period of immersion in water at 20° C until the age of testing. Values of loads required to fracture nodules, on compression between parallel platens are shown for determinations after 1, 3, 7 and 28 days curing and, in addition, after drying similar 28 day cured specimens at 95° C for 3 hours:

| | | kg breaking load |
|---|---|---|
| After | 1 day | 43 |
| | 3 days | 67 |
| | 7 days | 79 |
| | 28 days | 111 |
| | 28 days + 3 hours at 95° C | 373 |

For comparison, results for an ordinary Portland cement clinker ground to a specific surface area of 450 m²/kg and incorporated with this same ground ore, A, in nodules in the same proportion are:

| | | Kg breaking load |
|---|---|---|
| After | 1 day | 10 |
| | 3 days | 34 |
| | 7 days | 51 |
| | 28 days | 70 |
| | 28 days + 3 hours at 95° C | 220 |

Results for a second sample, B, of iron ore of gangue content 4 percent ground to a specific surface area of 391 m²/kg and incorporated in the same proportion with the cement derived from the clinker described in Example 3 by grinding to 450 m²/kg, in 15 mm diameter nodules cured under identical conditions are:

| | | kg breaking load |
|---|---|---|
| After | 1 day | 61 |
| | 3 days | 71 |
| | 7 days | 77 |
| | 28 days | 106 |
| | 28 days + 3 hours at 95° C | 263 |

For comparison, results for an ordinary Portland cement clinker ground to a specific surface area of 450 m²/kg and incorporated with this second ground ore, B, in nodules in the same proportion are:

| | | kg breaking load |
|---|---|---|
| After | 1 day | 13 |
| | 3 days | 28 |
| | 7 days | 35 |
| | 28 days | 62 |
| | 28 days + 3 hours at 95° C | 172 |

EXAMPLE 6

The following raw materials with principal oxide analyses of:

| | Limestone | Lias | Sand | Gypsum |
|---|---|---|---|---|
| $SiO_2$ | 2.7 | 24.1 | 97.8 | 0.5 |
| $Al_2O_3$ | 0.2 | 8.2 | 1.3 | 0.04 |
| $Fe_2O_3$ | 0.15 | 3.7 | 0.1 | 0.05 |
| CaO | 53.9 | 29.2 | 0.03 | 33.2 |
| $SO_3$ | 0.23 | 0.15 | 0.04 | 47.0 | were utilised to form a mix by blending in the approximate proportions (dry basis) 70.7 percent limestone, 12.3 percent lias, 9.1 percent sand, 5.6 percent gypsum together with 1.4 percent potassium sulphate and 0.9 percent impure calcium fluoride and grinding in a water swept ball mill to a residue of 4 percent on a B.S. 90μm sieve. The raw feed slurry so obtained was introduced into a coal-fired rotary kiln where sintering at around 1400° C produced a clinker with the following analysis:

| | | |
|---|---|---|
| $SiO_2$ | 21.7 | percent |
| $Al_2O_3$ | 2.7 | percent |
| $Fe_2O_3$ | 1.3 | percent |
| $Mn_2O_3$ | 0.02 | percent |
| $P_2O_5$ | 0.05 | percent |
| $TiO_2$ | 0.04 | percent |
| CaO | 67.5 | percent |
| MgO | 1.0 | percent |
| $SO_3$ | 3.4 | percent |
| $F_2$ (as fluoride) | 0.4 | percent |
| L.O.I. | 0.4 | percent |
| $K_2O$ | 1.1 | percent |
| $Na_2O$ | 0.2 | percent |

The LFS was 1.04, the S/R 5.43, the A/F 2.08 and the free lime content as determined by the method previously described 0.6 percent. The potential compound composition of this clinker as calculated by the method employed in Example 1 is:

| | | |
|---|---|---|
| $C_3S$ | 81.1 | percent |
| $C_2S$ | 1.1 | percent |
| $C_3A$ | 5.0 | percent |
| $C_4AF$ | 4.0 | percent |
| $CaSO_4$ | 3.7 | percent |
| Alkali sulphates | 2.5 | percent |
| Free lime | 0.6 | percent | together with other minor phases.

A cement was prepared by grinding this clinker to a specific surface area of 465 m²/kg as measured by the method in Example 1.

The paste setting times according to B.S. 12 (1971) were:

| At percent consistency water | 25.0 |
|---|---|
| Initial set | 205 minutes |
| Final set | 300 minutes |

When made up as a concrete and tested as in Example 1, the compressive strengths of 100 mm concrete cubes were as follows:

| After | 8 hours | 1 MN/m² |
|---|---|---|
| | 16 hours | 16 MN/m² |
| | 24 hours | 28 MN/m² |
| | 3 days | 45 MN/m² |
| | 7 days | 58 MN/m² |
| | 28 days | 63 MN/m² |

EXAMPLE 7

A clinker was prepared as in Example 1, employing the raw materials therein described, by blending in the approximate proportions (dry basis) 76.5 percent chalk, 9.5 percent sand, 9.2 percent clay, together with 2.3 percent iron pyrites, 2.0 percent potassium sulphate and 0.5 percent calcium fluoride, and sintering in an oil-fired furnace at around 1400° C to give a clinker with the following analysis:

| | | |
|---|---|---|
| $SiO_2$ | 21.7 | percent |
| $Al_2O_3$ | 2.2 | percent |
| $Fe_2O_3$ | 3.1 | percent |
| $Mn_2O_3$ | 0.03 | percent |
| $P_2O_5$ | 0.06 | percent |
| $TiO_2$ | 0.08 | percent |
| CaO | 66.5 | percent |
| MgO | 0.8 | percent |
| $SO_3$ | 3.8 | percent |
| $F_2$ (as fluoride) | 0.17 | percent |
| L.O.I. | 0.3 | percent |
| $K_2O$ | 1.2 | percent |
| $Na_2O$ | 0.04 | percent |

The LSF was 1.02, the S/R 4.09, A/F 0.71 and the free lime as determined by the method previously described 1.8 percent.

The potential compound composition of this clinker as calculated by the method employed in Example 1 is:

| | | |
|---|---|---|
| $C_3S$ | 71.4 | percent |
| $C_2S$ | 8.4 | percent |
| $C_3A$ | 0.6 | percent |
| $C_4AF$ | 9.4 | percent |
| $CaSO_4$ | 4.6 | percent |
| Alkali sulphates | 2.3 | percent |
| Free lime | 1.8 | percent | together with other minor phases.

A cement was prepared by grinding this clinker to a specific surface area of 450 m²/kg as measured by the method in Example 1.

The paste setting times according to B.S. 12 (1971) were:

| | |
|---|---|
| At percent consistency water | 29.0 |
| Initial set | 215 minutes |
| Final set | 250 minutes |

When made up as a concrete and tested as in Example 1 the compressive strengths of 100 mm concrete cubes were as follows:

| | |
|---|---|
| After 8 hours | 2 MN/m² |
| 16 hours | 19 MN/m² |
| 24 hours | 32 MN/m² |
| 3 days | 50 MN/m² |
| 7 days | 55 MN/m² |
| 28 days | 63 MN/m² |

EXAMPLE 8

A cement was prepared by intergrinding 80 percent of an active alite clinker prepared in a similar way to that described in Example 3 but with the following analysis:

| | | |
|---|---|---|
| $SiO_2$ | 22.3 | percent |
| $Al_2O_3$ | 2.6 | percent |
| $Fe_2O_3$ | 1.2 | percent |
| $Mn_2O_3$ | 0.05 | percent |
| $P_2O_5$ | 0.11 | percent |
| $TiO_2$ | 0.08 | percent |
| CaO | 68.2 | percent |
| MgO | 1.0 | percent |
| $SO_3$ | 2.6 | percent |
| $F_2$ (as fluoride) | 0.23 | percent |
| L.O.I. | 0.3 | percent |
| $K_2O$ | 1.2 | percent |
| $Na_2O$ | 0.10 | percent | with 20 percent of a $C_{12}A_7$-rich clinker specified below to a specific surface area of 450 m²/kg as measured by the method previously described. The $C_{12}A_7$-rich clinker used in this example had an analysis as follows:

| | | |
|---|---|---|
| $SiO_2$ | 19.3 | percent |
| $Al_2O_3$ | 19.0 | percent |
| $Fe_2O_3$ | 2.0 | percent |
| $Mn_2O_3$ | 0.05 | percent |
| $P_2O_5$ | 0.17 | percent |
| $TiO_2$ | 0.29 | percent |
| CaO | 56.5 | percent |
| MgO | 0.9 | percent |
| $SO_3$ | 0.27 | percent |
| $K_2O$ | 0.72 | percent |
| $Na_2O$ | 0.13 | percent |

The lime saturation factor was 0.72, the silica ratio 0.92, the alumina ratio 9.5, and the free lime as determined by the method previously described 1.5 percent. The potential compound composition of this clinker, allowing for the free lime, and calculated from its principal oxide analysis is as follows:

| | | |
|---|---|---|
| $C_2S$ | 55.3 | percent |
| $C_{12}A_7$ | 32.1 | percent |
| CA | 1.9 | percent |
| $C_4AF$ | 6.1 | percent | together with other minor phases.

No other addition was made to the cement and the total sulphate content as calculated from the clinker analyses was therefore 2.1 percent. The setting times according to B.S. 12 (1971) were:

| | |
|---|---|
| At percent consistency water | 29.0 |
| Initial set | 11 minutes |
| Final set | 12 minutes |

When made up as a concrete was tested as in Example 1 the compressive strengths of 100 mm concrete cubes were as follows:

| | | |
|---|---|---|
| After 2 hours | 1.8 | MN/m² |
| 8 hours | 2.3 | MN/m² |
| 24 hours | 15 | MN/m² |
| 3 days | 26 | MN/m² |
| 7 days | 34 | MN/m² |
| 28 days | 40 | MN/m² |

As a comparison a cement was prepared by intergrinding 80 percent of an ordinary Portland cement clinker with 20 percent of the $C_{12}A_7$-rich clinker specified above together with gypsum to a specific surface area of 450 m²/kg as measured by the method previously described. The ordinary Portland cement used in this comparative example had an analysis as follows:

| | | |
|---|---|---|
| SiO$_2$ | 20.2 | percent |
| Al$_2$O$_3$ | 5.1 | percent |
| Fe$_2$O$_3$ | 4.6 | percent |
| Mn$_2$O$_3$ | 0.11 | percent |
| P$_2$O$_5$ | 0.16 | percent |
| TiO$_2$ | 0.11 | percent |
| CaO | 65.0 | percent |
| MgO | 0.9 | percent |
| SO$_3$ | 1.0 | percent |
| K$_2$O | 0.93 | percent |
| Na$_2$O | 0.37 | percent |

The lime saturation factor was 0.99, the silica ratio 2.08, the alumina ratio 1.11, and the free lime as determined by the method previously described 1.8 percent. The potential compound composition of this clinker allowing for the free lime and calculated from its principal oxide analysis is as follows:

| | | |
|---|---|---|
| C$_3$S | 62.9 | percent |
| C$_2$S | 10.5 | percent |
| C$_3$A | 5.7 | percent |
| C$_4$AF | 14.0 | percent | together with other minor phases.

No other additions were made to the cement and the gypsum content was such as to give an SO$_3$ content in the final cement of 2.5 percent by weight.

The setting times according to B.S. 12 (1971) were:

| | |
|---|---|
| At per cent consistency water | 32.5 |
| Initial set | 10 minutes |
| Final set | 15 minutes |

When made up as a concrete and tested as in Example 1, the compressive strengths were as follows:

| | | |
|---|---|---|
| After 2 hours | 2.1 | MN/m$^2$ |
| 8 hours | 2.3 | MN/m$^2$ |
| 24 hours | 2.9 | MN/m$^2$ |
| 3 days | 6 | MN/m$^2$ |
| 7 days | 12 | MN/m$^2$ |
| 28 days | 20 | MN/m$^2$ |

EXAMPLE 9

A cement was prepared by intergrinding 50 percent of the active alite clinker described in Example 6 with 50 percent of the C$_{12}$A$_7$-rich clinker described in Example 8 together with gypsum and citric acid to a specific surface area of 450 m$^2$/kg as measured by the method previously described. The quantity of gypsum added was such as to give a total cement sulphate of 2.0 percent as determined by analysis, whilst the amount of citric acid added was 0.3 percent.

A cement water grout mix using this cement and having a water-cement ratio of 0.5 was prepared and its pumpability time as assessed from a simple penetration test was estimated as 30 minutes.

When used as a binder for coal shale, the overall composition of the mix being 1 part cement, 6 parts dry shale and 2 parts water, the setting time of the mix as judged by the time the mix was self-supporting was approximately 30 minutes and the compressive strengths were:

| | |
|---|---|
| After 2 hours | 90 p.s.i. |
| 4 hours | 110 p.s.i. |
| 24 hours | 120 p.s.i. |

As a comparison a cement was prepared by intergrinding 50 percent of the ordinary Portland cement clinker and 50 percent of the C$_{12}$A$_7$-rich clinker both described in Example 8 together with gypsum and citric acid to a specific surface area of 450 m$^2$/kg as measured by the method previously described. The quantity of gypsum added was such as to give a total cement sulphate of 2.0 percent as determined by analysis, whilst the amount of citric acid added was 0.5 percent.

A cement water grout mix using this cement with a water-cement ratio of 0.5 had a pumpability time as estimated above of 29 minutes.

When used as a binder for coal shale and tested as above the setting time was approximately 25 minutes and the compressive strengths were:

| | |
|---|---|
| After 2 hours | 85 p.s.i. |
| 4 hours | 95 p.s.i. |
| 24 hours | 105 p.s.i. |

EXAMPLE 10

A clinker comprising C$_{12}$A$_7$ was prepared as follows:
The following raw materials with principal oxide analyses of:

| | Chalk | China Clay |
|---|---|---|
| SiO$_2$ | 2.1 | 48.9 |
| Al$_2$O$_3$ | 0.2 | 34.8 |
| Fe$_2$O$_3$ | 0.1 | 0.3 |
| CaO | 54.6 | 0.2 | were utilised to form a mix by blending in the approximate proportions (dry basis) 72 percent chalk with 28 percent china clay and grinding in a ball mill to a residue of 5 percent on a B.S. 90μm sieve. The raw feed so obtained was mixed with water and pressed into cakes and these were sintered in an oilfired furnace at about 1300° C to produce a clinker with the following analysis:

| | | |
|---|---|---|
| SiO$_2$ | 23.7 | percent |
| Al$_2$O$_3$ | 14.6 | percent |
| Fe$_2$O$_3$ | 0.4 | percent |
| Mn$_2$O$_3$ | 0.05 | percent |
| P$_2$O$_5$ | 0.15 | percent |
| CaO | 59.0 | percent |
| MgO | 0.4 | percent |
| SO$_3$ | 0.20 | percent |
| K$_2$O | 0.70 | percent |
| Na$_2$O | 0.14 | percent |

The lime saturation factor was 0.70, the silica ratio 1.58, the alumina ratio 36.5 and the free lime as determined by the method previously described 1.0 percent. The potential compound composition of this clinker, allowing for free lime, and calculated from its principal oxide analysis is as follows:

| | | |
|---|---|---|
| C$_2$S | 67.9 | percent |
| C$_{12}$A$_7$ | 26.6 | percent |
| CA | 1.0 | percent |
| C$_4$AF | 1.2 | percent | together with other minor phases.

A cement was prepared by intergrinding 50 percent of this clinker comprising C$_{12}$A$_7$ with 50 percent of the active alite clinker described in Example 6 together with gypsum and citric acid to a specific surface area of 460 m²/kg as measured by the method previously described. The quantity of gypsum added was such as to give a total cement sulphate of 2.0 percent as determined by analysis, whilst the amount of citric acid added was 0.3 percent.

A cement water grout mix using this cement with a water-cement ratio of 0.5 had a pumpability time as estimated in Example 9 of 28 minutes.

When used as a binder for coal shale and tested as in Example 9, the setting time was 30 minutes and the compressive strengths were:

| After 2 hours | 70 p.s.i. |
|---|---|
| 4 hours | 80 p.s.i. |
| 24 hours | 90 p.s.i. |

As a comparison, a cement was prepared by intergrinding 50 percent of this clinker comprising $C_{12}A_7$ with 50 percent of the ordinary Portland cement clinker described in Example 8 together with gypsum and citric acid to a specific surface area of 455 m²/kg as measured by the method previously described. The quantity of gypsum added was such as to give a total cement sulphate of 2.1 percent as determined by analysis, whilst the amount of citric acid added was 0.4 percent.

A cement water grout mix using this cement with a water-cement ratio of 0.5 had a pumpability time, as estimated above, of 30 minutes.

When used as a binder for coal shale and tested as above, the setting time was 45 minutes and the compressive strengths were:

| After 2 hours | 45 p.s.i. |
|---|---|
| 4 hours | 55 p.s.i. |
| 24 hours | 70 p.s.i. |

EXAMPLE 11

A clinker was prepared as in Example 1, employing the raw materials therein described by blending in the approximate proportions (dry basis), 70.5 percent chalk, 7.5 percent sand, 13.2 percent clay, 6.5 percent gypsum, 0.2 percent iron oxide together with 2.0 percent potassium sulphate and 0.1 percent calcium fluoride, and sintering in an oil-fired furnace at around 1400° C to give a clinker with the following analysis.

| $SiO_2$ | 21.7 | percent |
|---|---|---|
| $Al_2O_3$ | 2.9 | percent |
| $Fe_2O_3$ | 1.3 | percent |
| $Mn_2O_3$ | 0.03 | percent |
| $P_2O_5$ | 0.09 | percent |
| $TiO_2$ | 0.13 | percent |
| CaO | 68.0 | percent |
| MgO | 1.0 | percent |
| $SO_3$ | 2.0 | percent |
| $F_2$ (as fluoride) | 0.07 | percent |
| L.O.I. | 1.5 | percent |
| $K_2O$ | 1.0 | percent |
| $Na_2O$ | 0.1 | percent |

The LSF was 1.04, the S/R 5.17, the A/F 2.23 and the free lime, as determined by the method previously described, 3.3 percent. The potential compound composition of this clinker as calculated by the method employed in Example 1 is:

| $C_3S$ | 74.2 | percent |
|---|---|---|
| $C_2S$ | 6.4 | percent |
| $C_3A$ | 5.5 | percent |
| $C_4AF$ | 4.0 | percent |
| $CaSO_4$ | 1.7 | percent |
| Alkali Sulphates | 2.1 | percent |
| Free Lime | 3.3 | percent | together with other minor phases.

A cement was prepared by grinding this clinker to a specific surface area of 460 m²/kg as measured by the method in Example 1.

The paste setting times according to B.S. 12 (1971) were:

| At per cent consistency water | 25.3 |
|---|---|
| Initial set | 90 minutes |
| Final set | 110 minutes |

When made up as a concrete and tested as in Example 1 the compressive strengths of 100 mm concrete cubes were as follows:

| After 8 hours | 7 MN/m² |
|---|---|
| 16 hours | 18 MN/m² |
| 24 hours | 23 MN/m² |
| 3 days | 34 MN/m² |
| 7 days | 42 MN/m² |
| 28 days | 52 MN/m² |

EXAMPLE 12

A clinker was prepared as in Example 3 employing the raw materials described therein but replacing the 2.0 percent potassium sulphate used in that mix with 1.6 percent potassium carbonate to give a clinker with the following analysis:

| $SiO_2$ | 21.8 | percent |
|---|---|---|
| $Al_2O_3$ | 2.6 | percent |
| $Fe_2O_3$ | 1.2 | percent |
| $Mn_2O_3$ | 0.02 | percent |
| $P_2O_5$ | 0.08 | percent |
| $TiO_2$ | 0.13 | percent |
| CaO | 67.0 | percent |
| MgO | 1.0 | percent |
| $SO_3$ | 2.9 | percent |
| $F_2$ (as fluoride) | 0.24 | percent |
| L.O.I. | 1.4 | percent |
| $K_2O$ | 1.5 | percent |
| $Na_2O$ | 0.06 | percent |

The LSF was 1.03, the S/R 5.74, the A/E 2.17 and the free lime as determined by the method previously described 2.4 percent. The potential compound composition of this clinker as calculated by the method employed in Example 1 was:

| $C_3S$ | 73.6 | percent |
|---|---|---|
| $C_2S$ | 7.1 | percent |
| $C_3A$ | 4.8 | percent |
| $C_4AF$ | 3.6 | percent |
| $CaSO_4$ | 2.7 | percent |
| Alkali sulphates | 2.9 | percent |
| Free Lime | 2.4 | percent | together with other minor phases.

A cement was prepared by grinding this clinker to a specific surface area of 460 m²/kg as measured by the method in Example 1.

The paste setting times according to B.S. 12 (1971) were:

| | | |
|---|---|---|
| At percent consistency water | 30.5 | |
| Initial set | 190 | minutes |
| Final set | 240 | minutes |

When made up as a concrete and tested as in Example 1 the compressive strengths of 100 mm concrete cubes were as follows:

| | |
|---|---|
| After 8 hours | 4 MN/m$^2$ |
| 16 hours | 24 MN/m$^2$ |
| 24 hours | 35 MN/m$^2$ |
| 3 days | 49 MN/m$^2$ |
| 7 days | 57 MN/m$^2$ |
| 28 days | 63 MN/m$^2$ |

EXAMPLE 13

A clinker was prepared as in Example 3 employing the raw materials described therein, but replacing the 0.5 percent of calcium fluoride used in that mix with 0.5 percent of magnesium silicofluoride (MgSiF$_6$) to give a clinker with the following analysis:

| | | |
|---|---|---|
| SiO$_2$ | 22.2 | percent |
| Al$_2$O$_3$ | 2.8 | percent |
| Fe$_2$O$_3$ | 1.4 | percent |
| Mn$_2$O$_3$ | 0.02 | percent |
| P$_2$O$_5$ | 0.08 | percent |
| TiO$_2$ | 0.14 | percent |
| CaO | 68.5 | percent |
| MgO | 0.9 | percent |
| SO$_3$ | 1.7 | percent |
| F$_2$ (as fluoride) | 0.12 | percent |
| L.O.I. | 1.0 | percent |
| K$_2$O | 1.0 | percent |
| Na$_2$O | 0.07 | percent |

The LSF was 1.03, the S/R 5.29, the A/F 2.00 and the free lime, as determined by the method previously described 2.1 percent. The potential compound composition of this clinker as calculated by the method employed in Example 1 is:

| | | |
|---|---|---|
| C$_3$S | 78.5 | percent |
| C$_2$S | 4.5 | percent |
| C$_3$A | 5.1 | percent |
| C$_4$AF | 4.3 | percent |
| CaSO$_4$ | 1.3 | percent |
| Alkali sulphates | 2.0 | percent |
| Free Lime | 2.1 | percent | together with other minor phases.

A cement was prepared by grinding this clinker to a specific surface area of 450 m$^2$/kg as measured by the method in Example 1.

The paste setting times according to B.S. 12 (1971) were:

| | | |
|---|---|---|
| At percent consistency water | 28.8 | |
| Initial set | 155 | minutes |
| Final set | 190 | minutes |

When made up as a concrete and tested as in Example 1 the compressive strengths of 100 mm concrete cubes were as follows:

| | |
|---|---|
| After 8 hours | 4 MN/m$^2$ |
| 16 hours | 13 MN/m$^2$ |
| 24 hours | 23 MN/m$^2$ |
| 3 days | 40 MN/m$^2$ |
| 7 days | 51 MN/m$^2$ |
| 28 days | 65 MN/m$^2$ |

EXAMPLE 14

A clinker was prepared as in Example 3 employing the raw materials described therein, but replacing the gypsum used with aluminum sulphate. The approximate proportions of the raw materials (dry basis) were 73.1 percent chalk. 6.4 percent clay, 7.9 percent hydrated aluminum sulphate, 10.1 percent sand together with 0.5 percent calcium fluoride and 2.0 percent potassium sulphate which after sintering in an oil-fired furnace gave a clinker with the following analysis

| | | |
|---|---|---|
| SiO$_2$ | 22.3 | percent |
| Al$_2$O$_3$ | 3.7 | percent |
| Fe$_2$O$_3$ | 0.7 | percent |
| Mn$_2$O$_3$ | 0.03 | percent |
| P$_2$O$_5$ | 0.07 | percent |
| TiO$_2$ | 0.12 | percent |
| CaO | 67.7 | percent |
| MgO | 0.9 | percent |
| SO$_3$ | 2.3 | percent |
| F$_2$ (as fluoride) | 0.24 | percent |
| L.O.I. | 0.7 | percent |
| K$_2$O | 1.0 | percent |
| Na$_2$O | 0.2 | percent |

The LSF was 1.01, the S/R 5.07, the A/F 5.29 and the free lime as determined by the method previously described 1.9 percent. The potential compound composition of this clinker calculated as in Example 1 was:

| | | |
|---|---|---|
| C$_3$S | 69.1 | percent |
| C$_2$S | 11.9 | percent |
| C$_3$A | 8.6 | percent |
| C$_4$AF | 2.1 | percent |
| CaSO$_4$ | 2.0 | percent |
| Alkali sulphate | 2.3 | percent |
| Free Lime | 1.9 | percent | together with other minor phases.

A cement was prepared by grinding this clinker to a specific surface area of 450 m$^2$/kg as measured by the method in Example 1.

The paste setting times according to B.S.12 (1971) were:

| | | |
|---|---|---|
| At percent consistency water | 29.0 | |
| Initial set | 125 | minutes |
| Final Set | 165 | minutes |

When made up as a concrete and tested as in Example 1 the compressive strengths of 100 mm concrete cubes were as follows:

| | |
|---|---|
| After 8 hours | 7 MN/m$^2$ |
| 16 hours | 18 MN/m$^2$ |
| 24 hours | 25 MN/m$^2$ |
| 3 days | 46 MN/m$^2$ |
| 7 days | 60 MN/m$^2$ |
| 28 days | 65 MN/m$^2$ |

EXAMPLE 15

A clinker was prepared as in Example 1 employing the raw materials described therein, by blending in the approximate proportions (dry basis) 62.5 percent chalk, 0.6 percent sand, 27.9 percent clay, 6.5 percent gypsum, together with 2.0 percent potassium sulphate and 0.5 percent calcium fluoride and sintering in an oil-fired furnace at around 1400° C to give a clinker with the following analysis:

| | | |
|---|---|---|
| $SiO_2$ | 20.4 | percent |
| $Al_2O_3$ | 5.4 | percent |
| $Fe_2O_3$ | 1.8 | percent |
| $Mn_2O_3$ | 0.02 | percent |
| $P_2O_5$ | 0.08 | percent |
| $TiO_2$ | 0.12 | percent |
| CaO | 65.5 | percent |
| MgO | 1.0 | percent |
| $SO_3$ | 3.7 | percent |
| $F_2$ (as fluoride) | 0.23 | percent |
| L.O.I. | 0.4 | percent |
| $K_2O$ | 1.1 | percent |
| $Na_2O$ | 0.2 | percent |

The LSF was 1.01, the S/R 2.83, the A/F 3.00 and the free lime as determined by the method previously described 1.9 percent. The potential compound composition of this clinker as calculated by the method employed in Example 1 is:

| | | |
|---|---|---|
| $C_3S$ | 57.8 | percent |
| $C_2S$ | 15.0 | percent |
| $C_3A$ | 11.3 | percent |
| $C_4AF$ | 5.5 | percent |
| $CaSO_4$ | 4.3 | percent |
| Alkali sulphates | 2.5 | percent |
| Free Lime | 1.9 | percent | together with other minor phases.

A cement was prepared by grinding this clinker to a specific surface area of 450 $m^2$/kg as measured by the method as used in Example 1.

The paste setting times according to B.S. 12 (1971) were:

| | | |
|---|---|---|
| At percent consistency water | 31.8 | |
| Initial set | 270 | minutes |
| Final set | 315 | minutes |

When made up as a concrete and tested as in Example 1 the compressive strengths of 100 mm concrete cubes were as follows:

| | |
|---|---|
| After 8 hours | 2 $MN/m^2$ |
| 16 hours | 20 $MN/m^2$ |
| 24 hours | 32 $MN/m^2$ |
| 3 days | 45 $MN/m^2$ |
| 7 days | 51 $MN/m^2$ |
| 28 days | 55 $MN/m^2$. |

EXAMPLE 16

A clinker was prepared as in Example 3 employing the raw materials described therein, but replacing the gypsum used with magnesium sulphate. The approximate proportions of the raw materials (dry basis) were 67.9 percent chalk, 13.4 percent clay, 9.5 percent hydrated magnesium sulphate, 6.7 percent sand, together with 0.5 percent calcium fluoride and 2.0 percent potassium sulphate which after sintering in an oil-fired furnace gave a clinker with the following analysis:

| | | |
|---|---|---|
| $SiO_2$ | 21.1 | percent |
| $Al_2O_3$ | 2.9 | percent |
| $Fe_2O_3$ | 1.1 | percent |
| $Mn_2O_3$ | 0.03 | percent |
| $P_2O_5$ | 0.07 | percent |
| $TiO_2$ | 0.12 | percent |
| CaO | 64.4 | percent |
| MgO | 3.4 | percent |
| $SO_3$ | 4.1 | percent |
| $F_2$ (as fluoride) | 0.25 | percent |
| L.O.I. | 0.5 | percent |
| $K_2O$ | 1.7 | percent |
| $Na_2O$ | 0.3 | percent |

The LSF was 1.02, the S/R 5.28, the A/F 2.64 and the free lime as determined by the method previously described 2.0 percent. The potential compound composition of this clinker calculated as in Example 1 was:

| | | |
|---|---|---|
| $C_3S$ | 66.1 | percent |
| $C_2S$ | 10.7 | percent |
| $C_3A$ | 5.8 | percent |
| $C_4AF$ | 3.3 | percent |
| $CaSO_4$ | 3.8 | percent |
| Alkali sulphates | 3.8 | percent |
| Free Lime | 2.0 | percent | together with other minor phases.

A cement was prepared by grinding this clinker to a specific surface area of 450 $m^2$/kg as measured by the method in Example 1.

The paste setting times according to BS.12 (1971) were:

| | | |
|---|---|---|
| At percent consistency water | 30.0 | |
| Initial set | 220 | minutes |
| Final set | 280 | minutes |

When made up as a concrete and tested as in Example 1 the compressive strengths of 100 mm concrete cubes were as follows:

| | |
|---|---|
| After 8 hours | 2 $MN/m^2$ |
| 16 hours | 20 $MN/m^2$ |
| 24 hours | 34 $MN/m^2$ |
| 3 days | 47 $MN/m^2$ |
| 7 days | 54 $MN/m^2$ |
| 28 days | 59 $MN/m^2$. |

EXAMPLE 17

A cement 'A' was prepared from the clinker produced in Example 3 ground to a specific surface area of 330 $m^2$/kg and admixed with varying proportions of pulverised fuel ash (P.F.A) of 415 $m^2$/kg specific surface area to produce pozzolanic cements.

When made up as a concrete and tested as in Example 1 the compressive strengths of 100 mm concrete cubes were as follows:

| Compressive strength ($MN/m^2$) after: | 3 days | 7 days | 28 days |
|---|---|---|---|
| 100 per cent cement 'A' | 42 | 50 | 57 |
| 80 per cent cement 'A': 20 per cent P.F.A. | 40 | 48 | 56 |
| 60 per cent cement 'A': 40 per cent P.F.A. | 35 | 38 | 45 |

For comparative purposes a normal Portland cement 'B' of 350 $m^2$/kg specific surface area was also admixed with varying proportions of the same P.F.A. as used above and when made up as a concrete and tested as in Example 1 the compressive strengths of 100 mm concrete cubes were as follows:

Compressive strength

-continued

| (MN/m²) after: | 3 days | 7 days | 28 days |
|---|---|---|---|
| 100 per cent cement 'B' | 20 | 29 | 41 |
| 80 per cent cement 'B' : 20 per cent P.F.A. | 19 | 28 | 40 |
| 60 per cent cement 'B' : 40 per cent P.F.A. | 17 | 22 | 33 |

EXAMPLE 18

A cement 'C' was prepared from 70 percent of the clinker produced in Example 3 ground with 30 percent of a granulated blast furnace slag to a specific surface area of 330 m²/kg.

For comparative purposes a cement 'D' was prepared from 66.5 percent of a normal Portland cement clinker and 3.5 percent gypsum ground together with 30 percent of the granulated blast furnace slag used in cement 'C' to a specific surface area of 330 m²/kg.

When these cements were made up as concretes and tested as in Example 1 the compressive strengths of 100 mm concrete cubes were as follows:

| Compressive strength (MN/m²) after: | 3 days | 7 days | 28 days |
|---|---|---|---|
| Cement 'C' | 28 | 38 | 54 |
| Cement 'D' | 13 | 21 | 40 |

EXAMPLE 19

A clinker was prepared as in Example 1, employing the raw materials therein described, by blending in the approximate proportions (dry basis) 67.8 percent chalk, 9.0 percent sand, 14.2 percent clay, 6.5 percent gypsum, together with 2.0 percent potassium sulphate and 0.5 percent calcium fluoride, and sintering in an oil-fired furnace at around 1400° C to give a clinker with the following analysis:

| $SiO_2$ | 24.1 | percent |
|---|---|---|
| $Al_2O_3$ | 3.1 | percent |
| $Fe_2O_3$ | 1.1 | percent |
| $Mn_2O_3$ | 0.03 | percent |
| $P_2O_5$ | 0.07 | percent |
| $TiO_2$ | 0.12 | percent |
| CaO | 64.5 | percent |
| MgO | 0.8 | percent |
| $SO_3$ | 3.3 | percent |
| $F_2$ (as fluoride) | 0.19 | percent |
| L.O.I. | 1.2 | percent |
| $K_2O$ | 1.2 | percent |
| $Na_2O$ | 0.04 | percent |

The LSF was 0.90, the S/R 5.74, the A/F 2.82 and the free lime as determined by the method previously described 0.7 percent.

The potential compound composition of this clinker as calculated by the method employed in Example 1 is:

| $C_3S$ | 47.7 | percent |
|---|---|---|
| $C_2S$ | 33.2 | percent |
| $C_3A$ | 6.4 | percent |
| $C_4AF$ | 3.3 | percent |
| $CaSO_4$ | 3.8 | percent |
| Alkali sulphates | 2.3 | percent |
| Free lime | 0.7 | percent | together with other minor phases.

A cement was prepared by grinding this clinker to a specific surface area of 450 m²/kg as measured by the method in Example 1.

The paste setting time according to B.S. 12 (1971) were:

| At percent consistency water | 28.5 | |
|---|---|---|
| Initial set | 300 | minutes |
| Final set | 355 | minutes |

When made up as a concrete and tested as in Example 1, the compressive strengths of 100 mm concrete cubes were as follows:

| After 8 hours | 1 MN/m² |
|---|---|
| 16 hours | 13 MN/m² |
| 24 hours | 21 MN/m² |
| 3 days | 36 MN/m² |
| 7 days | 44 MN/m² |
| 28 days | 58 MN/m² |

EXAMPLE 20

A clinker was prepared as in Example 1, employing the raw materials therein described, by blending in the approximate proportions (dry basis) 61.9 percent chalk, 1.5 percent sand, 27.6 percent clay, 6.5 percent gypsum, together with 2.0 percent potassium sulphate and 0.5 percent calcium fluoride, and sintering in an oil-fired furnace at around 1400° C to give a clinker with the following analysis:

| $SiO_2$ | 21.5 | percent |
|---|---|---|
| $Al_2O_3$ | 5.4 | percent |
| $Fe_2O_3$ | 1.8 | percent |
| $Mn_2O_3$ | 0.04 | percent |
| $P_2O_5$ | 0.08 | percent |
| $TiO_2$ | 0.15 | percent |
| CaO | 64.0 | percent |
| MgO | 0.9 | percent |
| $SO_3$ | 3.7 | percent |
| $F_2$ (as fluoride) | 0.14 | percent |
| L.O.I. | 0.9 | percent |
| $K_2O$ | 1.1 | percent |
| $Na_2O$ | 0.11 | percent |

The LSF was 0.94, the S/R 2.99, the A/F 3.00 and the free lime as determined by the method previously described 1.1 percent.

The potential compound composition of this clinker as calculated by the method employed in Example 1 is:

| $C_3S$ | 46.3 | percent |
|---|---|---|
| $C_2S$ | 26.8 | percent |
| $C_3A$ | 11.3 | percent |
| $C_4AF$ | 5.5 | percent |
| $CaSO_4$ | 4.5 | percent |
| Alkali sulphates | 2.3 | percent |
| Free lime | 1.1 | percent | together with other minor phases.

A cement was prepared by grinding this clinker to a specific surface area of 330 m²/kg as measured by the method in Example 1.

When made up as a concrete and tested as in Example 1, the compressive strengths of 100 mm concrete cubes were as follows:

| After 16 hours | 11 MN/m² |
|---|---|
| 24 hours | 20 MN/m² |

-continued

| | |
|---|---|
| 3 days | 35 MN/m² |
| 7 days | 42 MN/m² |
| 28 days | 52 MN/m² |

For comparative purposes a second cement, ground to 340 m²/kg, was prepared from an ordinary Portland cement clinker with similar values for the three major chemical parameters, namely LSF 0.94, S/R 3.1 and A/F 2.5.

When made up as a concrete and tested as in Example 1, the compressive strengths of 100 mm concrete cubes were as follows:

| | |
|---|---|
| After 16 hours | 5 MN/m² |
| 24 hours | 9 MN/m² |
| 3 days | 24 MN/m² |
| 7 days | 34 MN/m² |
| 28 days | 48 MN/m² |

What we claim is:

1. In a method of making a high strength cement of the Portland type wherein argillaceous and calcareous materials are combined to form clinker by heating in a kiln and the resulting clinker is ground to form a cement, the improvement wherein the hydraulic activity attributable to the alite content is improved by introducing into the kiln a combination of mineralisers which contains fluorine and sulphur in which the mineralisers contain 0.1 to 2.0 percent fluorine by weight and 1 to 10 percent $SO_3$ by weight based on the clinker, provided that an alkali metal compound which can be a component of the aforesaid combination of mineralisers is included so that at least 0.5 percent sulphate is retained in the clinker as alkali metal sulphate at least when the condition that the lime saturation factor be at least 0.98 and the silica ratio be at least 4 is not met.

2. A method according to claim 1, wherein the mineraliser containing flurorine is calcium fluorine.

3. A method according to claim 1, wherein the mineraliser containing sulphur is calcium sulphate or a hydrate thereof, an alkali metal sulphate or a double alkali metal calcium sulphate, or a mixture thereof.

4. A method according to claim 3, wherein the mineraliser containing sulphur is gypsum or potassium sulphate or a mixture thereof.

5. A method according to claim 1, wherein the mineraliser containing alkali metal is an alkali metal sulphate.

6. A method according to claim 5, wherein the alkali metal sulphate is potassium sulphate, a double alkali metal calcium sulphate or a mixture thereof.

7. A method according to claim 1, wherein components, containing fluorine, sulphate and alkali metal, of the mineralisers introduced, are retained in the clinker.

8. A method according to claim 7, wherein the clinker contains 0.01 to 1 percent fluoride and 0.1 to 5.0 percent $SO_3$, by weight of the clinker.

9. A method according to claim 8, wherein the clinker contains 0.01 to 0.5 percent fluoride by weight of the clinker.

10. A method according to claim 1, wherein the lime saturation factor of the clinker is from 0.98 to 1.08.

11. A method according to claim 10 wherein the silica ratio of the clinker is from 4 to 20.

12. A method according to claim 11, wherein the alite content of the clinker is at least 65 per cent thereof by weight.

13. A method according to claim 11, wherein the alite content of the clinker is at least 70 percent thereof by weight.

14. A method according to claim 1, wherein the lime saturation factor of the clinker is less than 0.98.

15. A method according to claim 14, wherein the silica ratio of the clinker is less than 4.

16. A method according to claim 1, wherein mineraliser components from the material forming the clinker are recycled for use in the combination of further clinker.

17. A method according to claim 1, wherein the clinker is ground to a specific surface area of from 200 to 800 m²/kg.

18. A method acccording to claim 1, wherein the clinker is ground to a specific surface area of from 250 to 500 m²/kg.

19. A method according to claim 1, wherein the clinker formed is mixed with a clinker containing from 7 to 90 percent by weight $C_{12}A_7$.

20. A method according to claim 1, wherein the combination of mineralisers introduced to the kiln contains 0.2 to 0.5 percent fluorine by weight and 2 to 5 percent $SO_3$ by weight based on the clinker.

21. A method according to claim 1 wherein at least part of the combination of mineralisers is introduced to the kiln in the raw feed.

22. A method according to claim 1, wherein at least part of the combination of mineralisers is introduced to the kiln in the fuel.

23. A method according to claim 1, wherein the kiln is a fluidised bed kiln.

24. A method according to claim 1, wherein the clinker is ground with sufficient calcium sulphate in the form of a natural or synthetic gypsum, hemihydrate, soluble anhydrite or a mixture thereof, to give a total $SO_3$ content of up to 8 percent in the finished cement.

25. A method according to claim 24 wherein sufficient calcium sulphate of whatever form is incorporated in the cement to give a total $SO_3$ content in the range 2 to 5 percent.

26. A method according to claim 1, wherein the clinker is ground with an accelerator.

27. A method according to claim 26, wherein the accelerator is calcium chloride.

28. A method according to claim 1, wherein the clinker is ground with a retarder.

29. A method according to claim 28, wherein the retarder is citric acid.

30. The method of obtaining a cement clinker containing at least 65% by weight alite, which comprises the steps of:
 a. forming a Portland cement raw feed mix;
 b. thermally converting said raw feed mix to clinker in the presence of mineralisers which contain an alkali metal, fluorine and sulphur, said mineralisers being present in amount sufficient to provide from 0.1–2.0% fluorine and 1–10% $SO_3$ by weight based on the clinker; and
 c. recovering a clinker containing at least 0.5% $CO_3$ combined with said alkali metal.

* * * * *